US007881710B2

(12) United States Patent
Keohane et al.

(10) Patent No.: US 7,881,710 B2
(45) Date of Patent: *Feb. 1, 2011

(54) MANAGING FEATURES AVAILABLE ON A PORTABLE COMMUNICATION DEVICE BASED ON A TRAVEL SPEED DETECTED BY THE PORTABLE COMMUNICATION DEVICE

(75) Inventors: Susann M. Keohane, Austin, TX (US);
Gerald F. McBrearty, Austin, TX (US);
Shawn P. Mullen, Buda, TX (US);
Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 374 days.

This patent is subject to a terminal disclaimer.

(21) Appl. No.: 12/033,008

(22) Filed: Feb. 18, 2008

(65) Prior Publication Data
US 2008/0139183 A1 Jun. 12, 2008

Related U.S. Application Data

(63) Continuation of application No. 11/191,579, filed on Jul. 28, 2005, now Pat. No. 7,369,845.

(51) Int. Cl.
*H04W 24/00* (2009.01)
(52) U.S. Cl. .................. 455/418; 455/404.1; 455/404.2; 455/414.1; 455/456.1; 455/456.3; 340/992; 340/436; 340/441; 340/466; 340/467; 701/5; 701/7; 701/8; 701/9
(58) Field of Classification Search .............. 455/404.1, 455/404.2, 414.1, 456.1–456.6, 414.2, 418; 340/425.5, 426.2, 430, 438, 441, 453, 457.1, 340/466, 467, 992, 993, 988, 436, 539.1; 705/5, 7, 8, 9
See application file for complete search history.

(56) References Cited

U.S. PATENT DOCUMENTS 6,459,365 B2 10/2002 Tamura
6,502,022 B1 12/2002 Chastain et al.

(Continued)

FOREIGN PATENT DOCUMENTS

WO 03/028342 A2 4/2003

OTHER PUBLICATIONS

"ChildSafe: Mobile Safety, Locator, Boundary Limiting System", disclosed by International Business Machines Corporation, Sep. 18, 2003. Retrieved online from <http://priorart.ip.com>, primary file YOR820000847.pdf.

(Continued)

*Primary Examiner*—Charles N Appiah
*Assistant Examiner*—Olumide T Ajibade Akona
(74) *Attorney, Agent, or Firm*—Matthew W. Baca; Amy J. Pattillo

(57) ABSTRACT

A portable communication device detects a current speed of travel of the portable communication device independent of any vehicle temporarily transporting the portable communication device. A speed based setting controller of the portable communication device compares the current speed to at least one threshold value set at the portable communication device. Responsive to the current speed exceeding the threshold value, the speed based setting controller automatically assigns a separate speed based setting to a current setting for each feature assigned to the threshold value, wherein each current setting for each feature designates the operability of that feature within the portable communication device, such that the current setting for each feature adjusts with a speed of travel as detected by the portable communication device.

6 Claims, 4 Drawing Sheets

U.S. PATENT DOCUMENTS

| | | | |
|---|---|---|---|
| 6,594,576 B2 * | 7/2003 | Fan et al. | 701/117 |
| 6,728,542 B2 | 4/2004 | Meda | |
| 6,778,837 B2 | 8/2004 | Bade et al. | |
| 6,816,731 B1 | 11/2004 | Maruyama | |
| 6,862,524 B1 * | 3/2005 | Nagda et al. | 701/209 |
| 7,013,151 B2 | 3/2006 | Hirokawa | |
| 7,129,826 B2 * | 10/2006 | Nitz et al. | 340/436 |
| 7,369,845 B2 * | 5/2008 | Keohane et al. | 455/418 |
| 2001/0044312 A1 | 11/2001 | Yamane | |
| 2002/0123329 A1 * | 9/2002 | Murray | 455/414 |
| 2002/0198005 A1 * | 12/2002 | Hilton et al. | 455/456 |
| 2005/0264404 A1 | 12/2005 | Franczyk et al. | |
| 2006/0009234 A1 | 1/2006 | Freer | |

OTHER PUBLICATIONS

"How the Wireless Phone GPS Works", San Francisco Chronicle, p. C-4, Mar. 19, 2001. Retrieved online from <<http://sfgate.com/cgi-bin/article.cgi?file=/chronicle/archive/2001/03/19/BU231766.DTL>>/

* cited by examiner

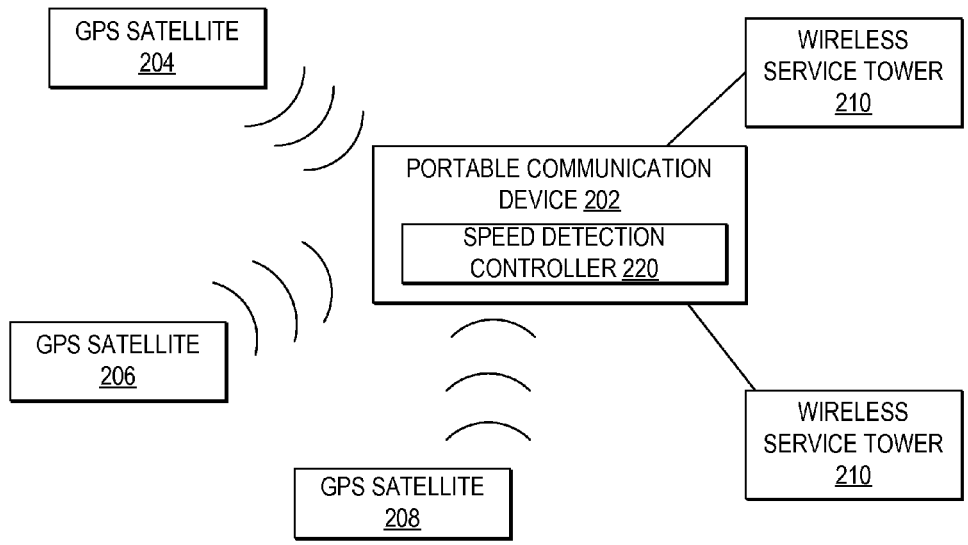
Fig. 2
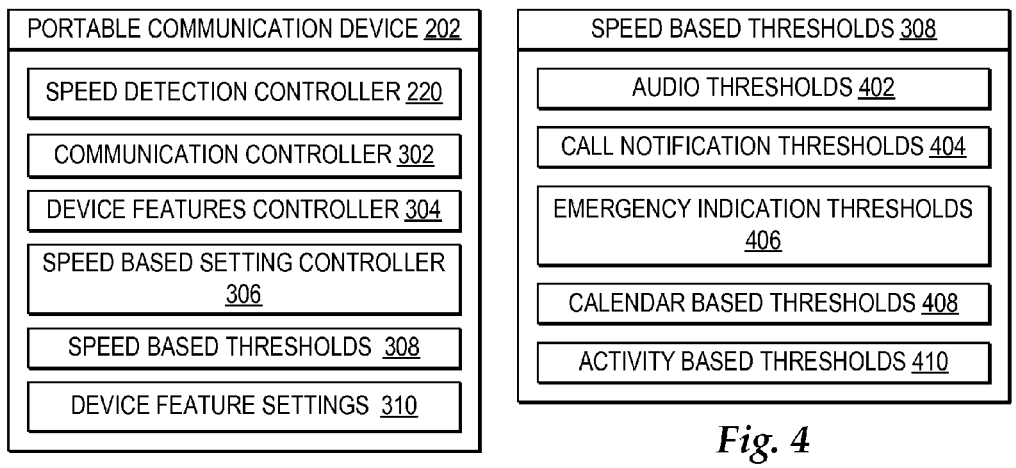
Fig. 3
Fig. 4

MANAGING FEATURES AVAILABLE ON A PORTABLE COMMUNICATION DEVICE BASED ON A TRAVEL SPEED DETECTED BY THE PORTABLE COMMUNICATION DEVICE

CROSS-REFERENCE TO RELATED APPLICATIONS:

This application is a continuation of commonly assigned U.S. patent application Ser. No. 11/191,579, filed Jul. 28, 2005, which is hereby incorporated herein by reference.

BACKGROUND OF THE INVENTION

1. Technical Field

The present invention relates in general to portable communication devices and, particularly, to a portable communication device managing available features of the portable communication device based on a detected speed of travel detected by the portable communication device.

2. Description of the Related Art

With the development of cellular communications and portable communication devices, such as a cellular telephone, a person can stay connected through a telephone conversation or checking electronic mail at the cellular telephone wherever cellular communication service is available.

Many people now carry a cellular telephone with them wherever they go. Not all environments, however, are suitable for all types of cellular telephone use. For example, many people now rely on the ability to use cellular telephones while driving a vehicle. With the increased use of portable communication devices by drivers, many accidents have been caused by the diversion created when a driver attempts to both drive the vehicle and locate and answer a ringing cellular telephone.

While some features have been added to cellular telephones to facilitate "hands-free" use to reduce the distraction caused by the cellular telephone, such as voice activated dialing and headsets, other features, such as video streaming and email, only continue to expand the ways that a driver can be distracted by looking at a cellular telephone while driving. Further, for many drivers, while answering a call or viewing email is dangerous while in motion within a vehicle, a daily commute may include multiple long stops at lights or other blocked traffic areas, where a user could receive and place calls more safely; current cellular telephone settings, however merely allow a user to either enable or disable features, such as call notifications. Thus, if a user wanted to shut off a call notification feature while driving, but receive call notifications when stationary, the user would need to manually select to enable the feature when stationary and manually select to disable the feature when no longer stationary, causing further distraction if the user decides to try to disable a call notification feature once traffic begins to move again.

In view of the foregoing, there is a need for a method, system, and program for a portable communication device, such as a cellular telephone, to self-detect a speed of travel independent of any mode of transportation, and to automatically adjust the settings for features of the portable communication device based on whether the current speed of travel exceeds specified threshold values.

SUMMARY OF THE INVENTION

The present invention provides for a portable communication device enabled to manage operability of features of the portable communication device based on a detected speed of travel of the portable communication device as detected by the portable communication device.

A portable communication device detects a current speed of travel of the portable communication device independent of any vehicle temporarily transporting the portable communication device. A speed based setting controller of the portable communication device compares the current speed to at least one threshold value set at the portable communication device. Responsive to the current speed exceeding the threshold value, the speed based setting controller automatically assigns a separate speed based setting to a current setting for each feature assigned to the threshold value, wherein each current setting for each feature designates the operability of that feature within the portable communication device, such that the current setting for each feature adjusts with a speed of travel as detected by the portable communication device.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a block diagram depicting one embodiment for self-detection of current speed by a portable communication device;

FIG. 3 is a block diagram depicting one embodiment of components of a portable communication device;

FIG. 4 is a block diagram depicting examples of types of thresholds set in the speed based thresholds;

DETAILED DESCRIPTION OF THE PREFERRED EMBODIMENT

In the present invention, a portable communication device is accessible to a user in many different environments. A portable communication device may include, but is not limited to, any wireless or mobile communications device used for voice communications, text messaging communications, data communications, and audio or video streaming. A portable communication device may be implemented as computer system, such as the computer system described in FIG. 1, which provides communication services via a wireless communication network. A single portable communication device may receive communication services from a single or multiple communication service providers.

Figure 1:
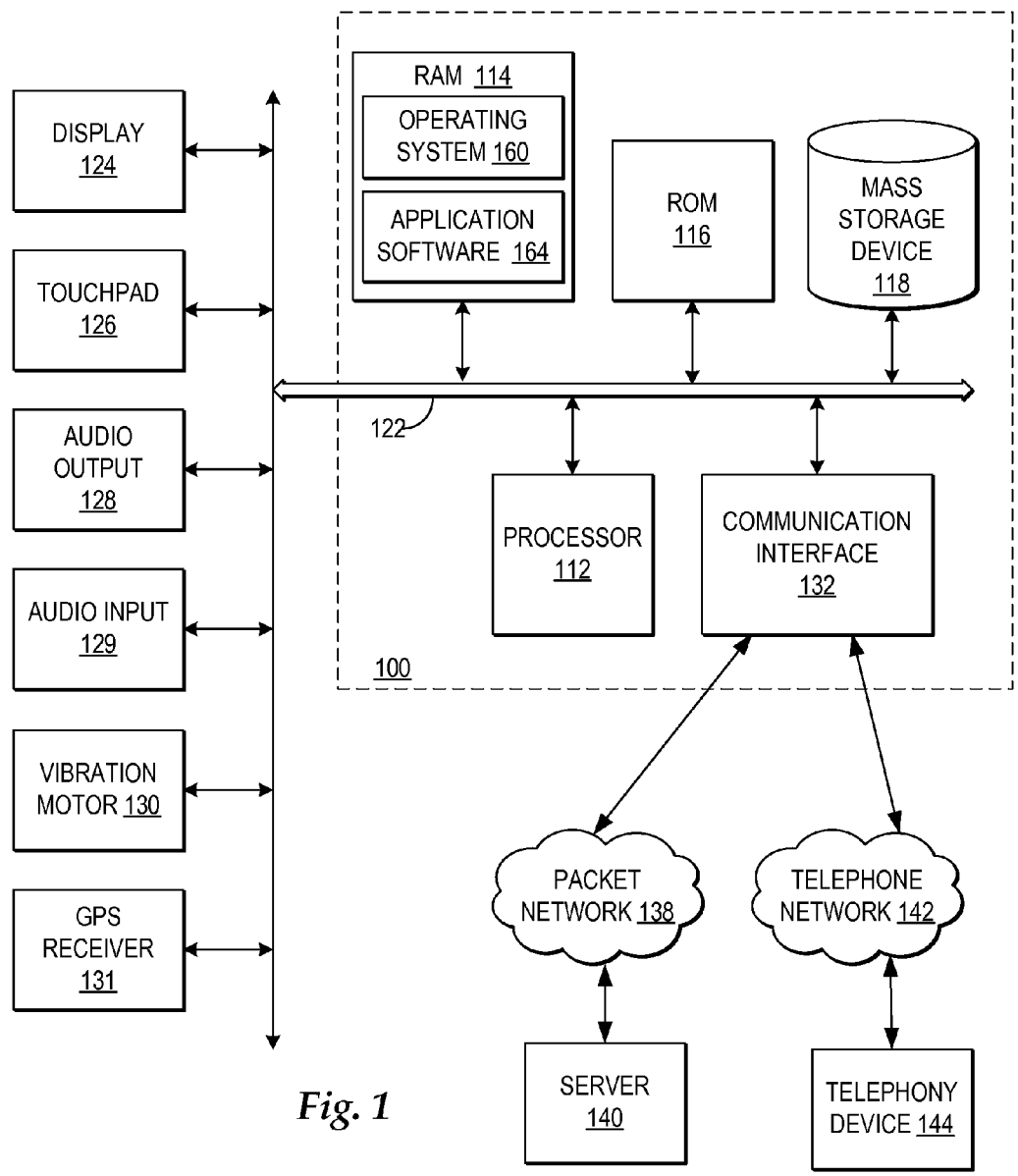
FIG. 1 is a block diagram depicting a computer system which may be implemented in a portable communication device.

Referring now to the drawings and in particular to FIG. 1, there is depicted one embodiment of a computing system through which the present method, system, and program may be implemented. The invention may be executed in a variety of systems, including a variety of computing systems and electronic devices.

Computer system 100 includes a bus 122 or other communication device for communicating information within computer system 100, and at least one processing device such as processor 112, coupled to bus 122 for processing program code and data. Bus 122 may include low-latency and higher latency paths that are connected by bridges and adapters and controlled within computer system 100 by multiple bus controllers. Processor 112 may be a general-purpose processor such as IBM's PowerPC (PowerPC is a registered trademark of International Business Machines Corporation) processor.

Processor 112 is coupled, directly or indirectly, through bus 122 to memory elements. During normal operation, processor 112 processes data under the control of program code accessed from the memory elements. Memory elements can include local memory employed during actual execution of the program code, such as random access memory (RAM) 114, bulk storage, such as mass storage device 118, and cache memories (not depicted) which provide temporary storage of at least some program code to reduce the number of times code must be retrieved from bulk storage during execution. In one example, the program code accessible in RAM 114 includes, for example, an operating system 160 and application software 164. Operating system 160 includes program code that facilitates, for example, a graphical user interface (GUI) via a display 124 and other output interfaces.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. For example, in one embodiment, operating system 160 and/or application software 164 contains program code that when executed on processor 112 carry out the operations depicted in the flow diagrams and flowchart of FIG. 8 and other operations described herein. Alternatively, the steps of the present invention might be performed by specific hardware components that contain hardwired logic for performing the steps, or by any combination of programmed computer components and custom hardware components. Additionally, RAM 114 may include an application programming interface (not depicted) or other interface that provides extensions to enable application developers to develop application software 164 that extend the functionality of operating system 160.

In addition, the invention can take the form of a computer program product accessible from a computer-usable or computer readable medium providing computer readable program code for use by or in connection with computer system 100 or any instruction execution system. For purposes of this description, a computer-usable or computer readable medium can be any apparatus that can contain, store, communicate, propagate, or transport the program for use by or in connection with the instruction execution system, apparatus, or device. In one example, a computer-usable or computer readable medium is any apparatus that participates in providing program code to processor 112 or other components of computer system 100 for execution.

Such a medium may take many forms including, but not limited to, electronic, magnetic, optical, electromagnetic, infrared, or semiconductor system (or apparatus or device) or a propagation medium. Examples of a computer readable medium include, but are not limited to, a semiconductor or solid state memory, magnetic tape, a flexible disk, a hard disk, a removable computer diskette, random access memory (RAM) 114, read-only memory (ROM) 116, punch cards or any other physical medium with patterns of holes, a rigid magnetic disk and an optical disk. Current examples of optical disks include a compact disc ROM (CD-ROM), a compact disc-read/write (CD-R/W) and a digital video disc (DVD). In another example, a computer readable medium may include mass storage device 118, which as depicted is an internal component of computer system 100, but may be provided as a device external to computer system 100.

A communication interface 132 facilitates communication with network accessible systems, such as server 140 and telephony device 144, through one or more packet-switched networks, such as packet network 138, or telephony networks, such as telephone network 142. One or more wireless communication service providers or local area networks enable and facilitate the connection between communication interface 132 and Internet 138 or telephone network 142. Packet network 138 may refer to the worldwide collection of networks and gateways that use a particular protocol, such as Transmission Control Protocol (TCP) and Internet Protocol (IP), to communicate with one another. Telephone network 142 may include the public switched telephone system (PSTN), cellular networks, and other networks, such as the Internet, which continue to be incorporated into the telephone system.

In general, packet network 138, telephone network 142 and the wireless communication service providers enabling access to these networks use electrical, electromagnetic, or optical signals that carry audio or data streams. The signals through the various networks and the signals passing through communication interface 132, which carry the audio or data to and from computer system 100, are examples of forms of carrier waves transporting the information. In one example, a remote computer, such as server 140 transfers the program code for the invention to requesting computer system 100 by way of data signals embodied in a carrier wave or other propagation medium via a connection to communication interface 132.

In addition, computer system 100 typically includes at least one interface that facilitates communication or a communication feature, implemented through an input or output device. These input/output devices are coupled to computer system 100 either directly or indirectly through wired and wireless connections to multiple input/output (I/O) controllers, adapters, and expansion slots coupled to one of the multiple levels of bus 122. For example, an audio output device 128 and audio input device 129 are connectively enabled on bus 122 for controlling audio outputs and inputs. While in the embodiment audio output device 128 and audio input device 129 are individually distinguished, a single interface, such as a wireless or wireline headset, may incorporate both audio input and audio output features. A display device 124 is also connectively enabled on bus 122 for providing visual, tactile or other graphical representation formats. A touchpad 126 is connectively enabled on bus 122 as an interface for user inputs to computer system 100. A vibration motor 130 is connectively enabled on bus 122 for causing the housing of computer system 100 to vibrate to provide output of call notifications such as incoming calls, new voice mails, and new electronic mail, alarms, and other indications. A GPS receiver 131 is connectively enabled on bus 122 for passively receiving satellite signals that are then used by operating system 160 and/or application software 164 to detect a current location and current speed of travel of computer system 100.

In alternate embodiments of the present invention, additional input and output devices may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

With reference now to FIG. 2, a block diagram depicts one embodiment for self-detection of current speed by a portable communication device. According to an advantage, a portable communication device 202 detects a current speed of travel of the device by sampling a location at a particular rate of time, calculating a distance traveled from a last sampled location to a current sampled location, and then calculating a current speed of travel between the last sampled location and current sampled location over the particular rate of time. In particular, a speed detection controller 220 within portable communication device 202 enables portable communication device 202 to detect a current speed of travel. Speed detection controller 220 may detect a current location and calculate a current speed in multiple ways.

In one embodiment, speed detection controller 220 detects a current location by detecting, at a built-in GPS receiver, such as GPS receiver 131, signals from multiple GPS satellites, such as GPS satellites 204, 206, and 208. GPS receiver 131 calculates the distance of GPS receiver 131 from each of GPS satellites 204, 206, and 208 based on the signal received from each GPS satellite and calculates a location by intersecting the distance calculations. It will be understood that GPS receiver 131 may detect only a single signal from a GPS satellite or may detect more than three signals and regardless of the number of signals, GPS receiver 131 may calculate a location based on those signals received.

In another embodiment, speed detection controller 220 detects a current location by detecting a distance between portable communication device 202 and one or more wireless service towers and antennas, such as wireless service tower 210 and 212. Speed detection controller 220 may be enabled to detect the distance from wireless service towers 210 and 212 or the wireless service provider may detect and transmit the distance of portable communication device 202 for detection by speed detection controller 220.

In addition to calculating a current speed from the rate of movement from multiple locations at multiple points in time, speed detection controller 220 may detect a current speed from a pace of a person carrying portable communication device 202. In one example, portable communication device 202 includes built-in pace sensor that enables speed detection controller 220 to detect a pace of a person carrying portable communication device 202. In another example, portable communication device 202 is enabled to detect a wireless signal transmitted from a speed and distance monitor attached to a person carrying portable communication device 202. For example, a foot mounted device for detecting speed and distance of a runner may transmit a signal to portable communication device 202 indicating data that enables speed detection controller 220 to calculate a current speed.

It is important to note that speed detection controller 220 may calculate current speeds by calculating an average speed over a particular period of time or the average speed over a particular distance, for example. In addition, it is important to note that the current speed calculated by speed detection controller 220 may include both horizontal and vertical speed elements.

Further, it is important to note that portable communication device 202 may detect other types of information from other information sources that enables speed detection controller 220 to calculate a speed of travel of portable communication device 202. In addition, it will be understood that portable communication device 202 may detect signals indicating speed from a satellite transmission, a service provider transmission, a vehicle transmission, or other transmitter with which speed detection controller 220 may supplement a current speed calculation or from which speed detection controller 220 may infer a current speed of travel of portable communication device 202.

With reference now to FIG. 3, a block diagram illustrates one example of components of a portable communication device. It will be understood that in addition to the components depicted, additional components may be implemented within a portable communication device to facilitate communication and other functions of the portable communication and that each component may require both software and hardware elements for implementation.

In the example, in addition to speed detection controller 220, as described with reference to FIG. 2, portable communication device 202 includes a communication controller 302. Communication controller 302 performs the functions required for enabling communication to and from portable communication device 202 via at least one communication network, such as packet network 138 or telephone network 142, as described with reference to FIG. 1.

In addition, portable communication device 202 includes a device features controller 304. Device features controller 304 regulates the performance of features of portable communication device 202. In particular, device features controller 304 regulates the performance of features of portable communication device 202 according to the current setting for each feature in device feature settings 310 from among the multiple available settings for each feature. Thus, the current setting for each feature in device feature settings 310 designates the operability of each feature.

Features of portable communication device 202 regulated by device features controller 304 may include, but are not limited to, the different types of communications enabled by communication controller 302 and the interfaces facilitating input and output for communications and notification of incoming communication requests. For example, device features controller 304 may control the settings for the features provided through display 124, touchpad 126, audio output device 128, audio input device 129, and vibration motor 130. In addition, features of portable communication device 202 may include other functions of portable communication device with multiple available settings in device feature settings 310.

Device features controller 304 facilitates user selection of current settings for device feature settings 310. Device features controller 304 may provide menus of selectable settings for each feature or facilitate selection through other available selection formats. For example, for a call notification feature, a user may select current settings from a menu to enable a ring tone at a low volume for each incoming call and to disable vibration for each incoming call.

In addition to user specified feature settings, according to an advantage, a speed based setting controller 306 automatically sets current settings within device feature settings 310 based on current speeds. In particular, speed based setting controller 306 receives the current speed of portable communication device 202 from speed detection controller 220 and compares the current speed with the entries in speed based thresholds 308.

When speed based setting controller 306 receives a current speed that exceeds a threshold in one of the entries in speed based thresholds 308, speed based setting controller 306 adjusts at least one current setting for a feature in device feature settings 310 as triggered by the current speed exceeding a threshold. In addition, when speed based setting controller 306 detects the current speed fall below a threshold in one of the entries in speed based thresholds 308, speed based setting controller 306 may adjust at least one current setting in device feature settings 310 to the original, non-speed based setting or to a setting designated in speed based thresholds 308.

Speed based thresholds 308 may include user selected entries, default manufacturer setting entries, and downloaded threshold entries. Speed based setting controller 306 may facilitate user selection of entries in speed based thresholds 308 and facilitate searching for and downloading threshold entries to speed based thresholds 308. Further, speed based setting controller 306 may learn speeds at which different features are safe for a user by prompting the user to indicate whether the user could use a particular feature safely at different speeds.

It is important note that although speed detection controller 220, communication controller 302, device features controller 304, and speed based setting controller 306 are depicted individually, these controllers may be considered as a single component or functionally integrated into a single component. It will be understood that each of speed detection controller 220, communication controller 302, device features controller 304, and speed based setting controller 306 may be separately downloaded to portable communication device 202 and may be provided by a single vendor or multiple disparate vendors. Further, it will be understood that speed based thresholds 308 and device feature settings 310 may be implemented through multiple types of data storage structures and files and that speed based thresholds 308 and device feature settings 310 may be integrated into a single type of data storage structure.

Referring now to FIG. 4, a block diagram illustrates examples of types of thresholds set in the speed based thresholds. It will be understood that additional types of thresholds may be included and that each type of threshold may include one or more entries.

In the example, speed based thresholds 308 includes audio thresholds 402. Audio thresholds 402 may include, for example, thresholds values for adjusting whether each type of audio feature is enable or disabled, a volume of the audio feature, and other settings available for each audio feature. Audio features may be provided through built-in and external audio input and output devices. In one example, an entry in audio thresholds 402 may automatically disable a built-in speaker and only enable a headset speaker once the current speed exceeds 10 miles per hour.

In addition, in the example, speed based thresholds 308 includes call notification thresholds 404. Call notification thresholds 404 may include, for example, threshold values for adjusting which types of call notification features are enabled and disabled for an incoming call, the volume, intensity and number of repetitions of enabled call notification features, and other settings available for each call notification feature. Notifications of upcoming calls may include, for example, a vibration, an audible ring tone, a text indicator, or a flashing screen. In one example, an entry in call notification thresholds 404 may automatically disable all call notifications once speed based setting controller 306 detects a speed greater than 15 miles per hour.

Speed based thresholds 308 also includes emergency indication thresholds 406. Emergency indication thresholds 406 are threshold values that when detected in succession indicate a possible emergency and specify setting adjustments to aid a person needing to communicate in the emergency. For example, speed based thresholds indicative of a car wreck may include detecting a change in horizontal speed from 50 or more miles per hour to 0 miles per hour in less than five seconds with an elevation change of more than 40 feet. The settings for speed based thresholds indicative of a car wreck may include automatically turning on a microphone and triggering voice activated dialing, for example.

Further, speed based thresholds 308 includes calendar based thresholds 408. Calendar based thresholds 408 are thresholds values based on a time of day or scheduled event. In one example, if a calendar based threshold may specify that when a calendar indicates work hours, a particular selection of thresholds are selected. In another example, if a calendar based entry includes a flight schedule, then general flight based settings are applied surrounding the scheduled flight time.

Speed based thresholds 308 also includes activity based thresholds 410. Activity based thresholds 410 are threshold values specified by type of user activity. For example, different thresholds may be selected based on whether a user is driving, flying, walking, cycling, mountain climbing, or other types of user activity. As previously described, a calendar may indicate the type of current activity. Alternatively, a user may select a current activity from a menu facilitated by speed based setting controller 306. Further, as with emergency indication thresholds 406, activity based thresholds 410 may specify movement, that when detected, indicates a particular type of exercise.

In specifying each threshold value in the different types of speed based thresholds 308, the threshold value may be represented by a numerical speed, by a type of speed, by a range of speed, or other settings that can be compared with a current speed. For example, a user may designate a thresholds value at 20 miles per hour. In other example, a user may designate a threshold value at 4 miles per hour greater than a walking pace speed, where activity based thresholds 410 includes the speed value for a walking pace.

Figure 5:
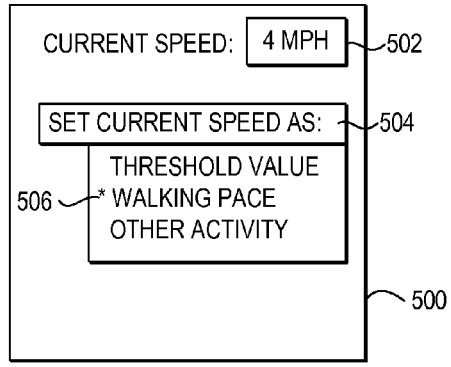
FIG. 5 is a block diagram depicting one embodiment of an interface for a user to teach the portable communication device the speeds that the particular user operates at in association with different activities and to select thresholds based on the current speed.

With reference now to FIG. 5, an illustrative diagram depicts an example of an interface for a user to teach the portable communication device the speeds that the particular user operates at in association with different activities and to select thresholds based on the current speed. In the example, a display interface 500 includes text indicating the current speed as 4 miles per hour at reference numeral 502. In addition, display interface 500 includes a selectable menu 504 with multiple options for capturing the current speed and setting the current speed to a threshold value, a walking pace, or another activity. It will be understood that selectable menu 504 may include additional options for teaching portable communication device 202 about how the user wants the portable communication device to function at the current speed.

In the example, as indicated at reference numeral 506 by a selection arrow, a user selects to assign the current speed to the activity of "walking pace". The current speed would be added as the speed for a walking pace in activity based thresholds 410. A user may select multiple speeds over time in association with "walking pace", such that speed based setting controller 306 can learn an average walking pace for the user and may determine the walking pace associated with different activities in a calendar or with different times of day, for example.

In particular, detecting a walking or running pace is important so that a user may set a first threshold at a speed that is greater than a walking pace and therefore indicative that the user is riding in a vehicle and not walking or running. For example, if a walking pace for a particular user averages 3 to 4 miles per hour, than the user may set the first threshold to a speed slightly faster than the walking pace with feature settings intended to reduce distractions while a user is driving.

In addition, in the example, if a user selected the option from selectable menu 504 to set a particular speed as a threshold value, then speed based setting controller 306 may further prompt the user to select a type of threshold and to select feature settings for the threshold value. By enabling a user to select a current speed as a threshold value, a user may customize the settings at speed thresholds relevant to that user.

Further, in selecting any of the options from selectable menu 504, speed based setting controller 306 may further prompt the user to select whether the current speed sampling is to be stored or whether the variances in the speed over a longer range of time should be sampled and stored.

Figure 6:
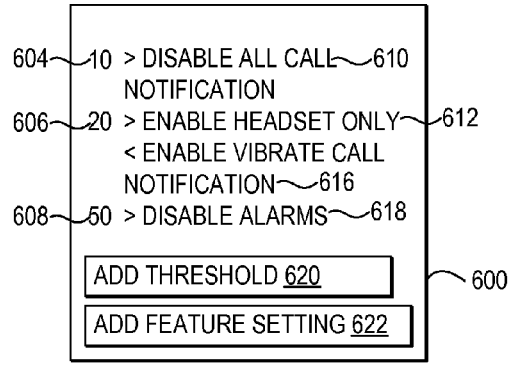
FIG. 6 is an illustrative diagram depicting examples of combined thresholds settings for audio thresholds and call notification thresholds within a display interface.

Referring now to FIG. 6, an illustrative diagram illustrates examples of combined thresholds settings for audio thresholds and call notification thresholds within a display interface. As illustrated, speed based setting controller 306 facilitates a display interface 600 including the thresholds and feature settings combined from audio thresholds 402 and call notification thresholds 404. It will be understood that in alternate embodiments, other types of thresholds from among speed based thresholds 308 may be graphically combined for display to a user. Further, it will be understood that speed based setting controller 306 may implement other presentations of data stored in speed based thresholds 308.

In the example, display interface includes threshold values 604, 606, and 608, where each of the threshold values is specified by a particular number of miles per hour. It will be understood that each of threshold values 604, 606, and 608 may alternatively be specified by a type of activity or other variable with an associated speed.

At least one feature setting is associated with each of threshold values 604, 606, and 608. In the example, feature settings with a ">" indicate settings triggered by exceeding the threshold value. For example, at 10 mph, a feature setting indicated at reference numeral 610 requires disabling all call notification features. In addition, in the example, at 20 mph, a feature setting indicated at reference numeral 612 requires enabling only a headset for audio input and output for any ongoing calls. Further, in the example, at 50 mph, a feature setting indicated at reference numeral 618 requires disabling alarms.

In addition, feature settings with a "<" indicate specific settings triggered by a speed decreasing through a threshold value. For example, at 20 mph, a feature setting indicated at reference numeral 618 requires enabling a vibrating feature for call notifications. In addition, a user may designate that unless specified, as the current speed decreases below any of the specified threshold values, the feature setting designated for that threshold value on acceleration returns to the original non-speed based setting.

A user may add additional threshold values by selecting selectable button 620, which triggers a prompt for a user to specify the threshold value. In addition, a user may add additional feature settings by selecting selectable button 622, which triggers a prompt for a user to specify or edit a feature setting for a particular threshold value.

Figure 7:
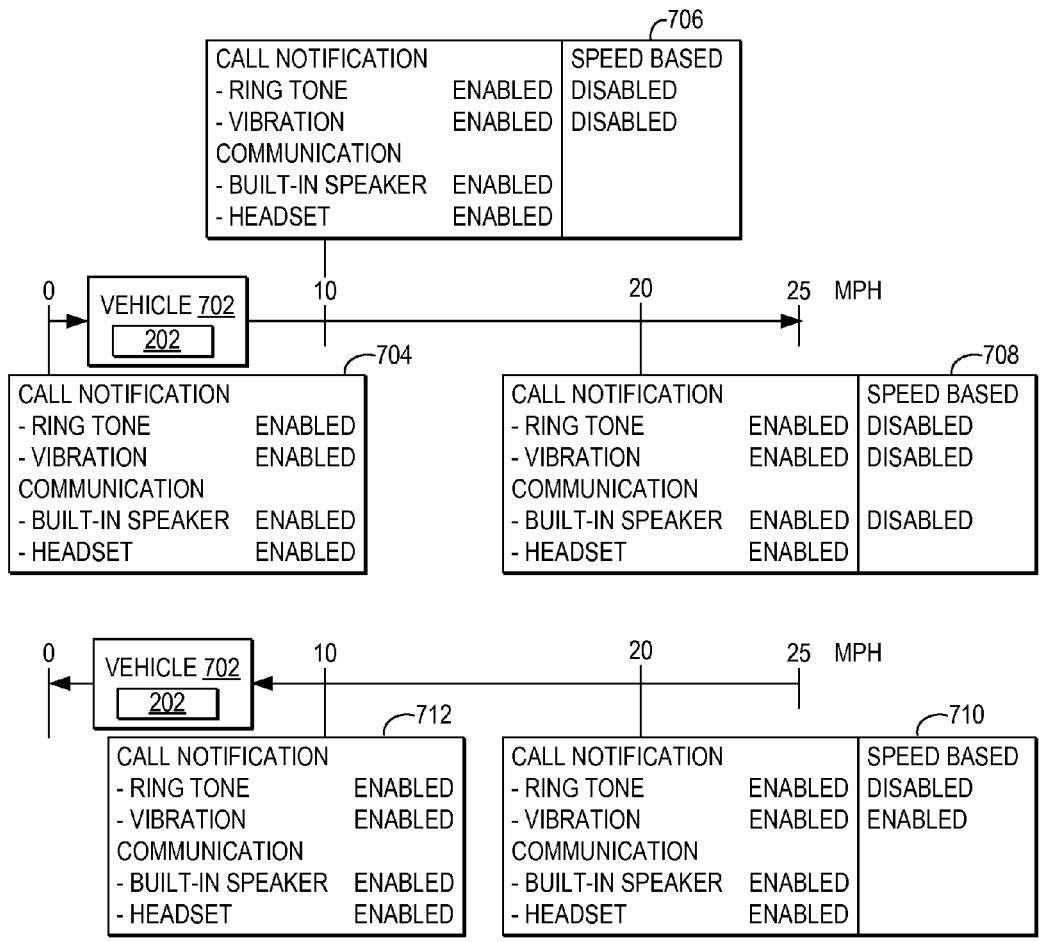
FIG. 7 is an illustrative diagram depicting examples of the settings in the device feature settings and adjusted by the speed based setting controller over the path of a vehicle.

With reference now to FIG. 7, an illustrative diagram depicts an example of the settings in the device feature settings and adjusted by the speed based setting controller over the path of a vehicle. In the example, a user carries portable communication device 202 with the thresholds set in display interface 600 in a vehicle 702. It is important to note that vehicle 702 may include transportation including, but not limited to, automobiles, buses, trains, airplanes, and other modes of transportation. In addition, it is important to note that although the example is depicted with vehicle 702 traveling in along a horizontal axis, the portable communication device 202 traveling within vehicle 702 may detect both horizontal and vertical speeds.

In the example, a portable communication device 202 initially sits still within vehicle 702, such as when vehicle 702 is waiting in traffic. The current settings within device feature settings 310 indicate, at reference numeral 704, that the non-speed based device settings enable call notifications through ring tones and a vibrating feature and audio input and output through a built-in speaker and microphone or a headset. It will be understood that although not depicted in the example, device feature settings 310 may include settings in addition to those depicted at reference numeral 704.

In the example, device feature settings 310 includes the non-speed based device settings and a column of speed based device settings, where device features controller 304 yields to speed based device settings when specified. In an alternate embodiment, speed based settings may replace non-speed based settings in device feature settings 310. Further, in an alternate embodiment, speed based setting controller 306 may take over control of a device feature when a speed based setting is triggered instead of adjusting the setting in device feature settings 310.

Thus, as the vehicle accelerates after a light, at 10 mph, speed based setting controller 306 adjusts the settings in device feature settings 310 to include speed based device settings that disable all call notification features and enable only the headset for voice communications, as illustrated at reference numeral 706 and at 20 mph speed based setting controller 306 adjusts the settings in device feature settings 310 to include speed based device settings that disable all communication interfaces except for a headset, as illustrated at reference numeral 708.

In the example, once vehicle 702 reaches 25 mph, vehicle 702 begins to decelerates. During deceleration, at 20 mph, speed based setting controller 306 adjusts the setting in device feature settings 310 to enable the vibrating call notification feature, as indicated at reference numeral 710. At 10 mph, however, speed based setting controller 306 removes the speed based settings in device feature settings 310, as illustrated at reference numeral 712.

Figure 8:
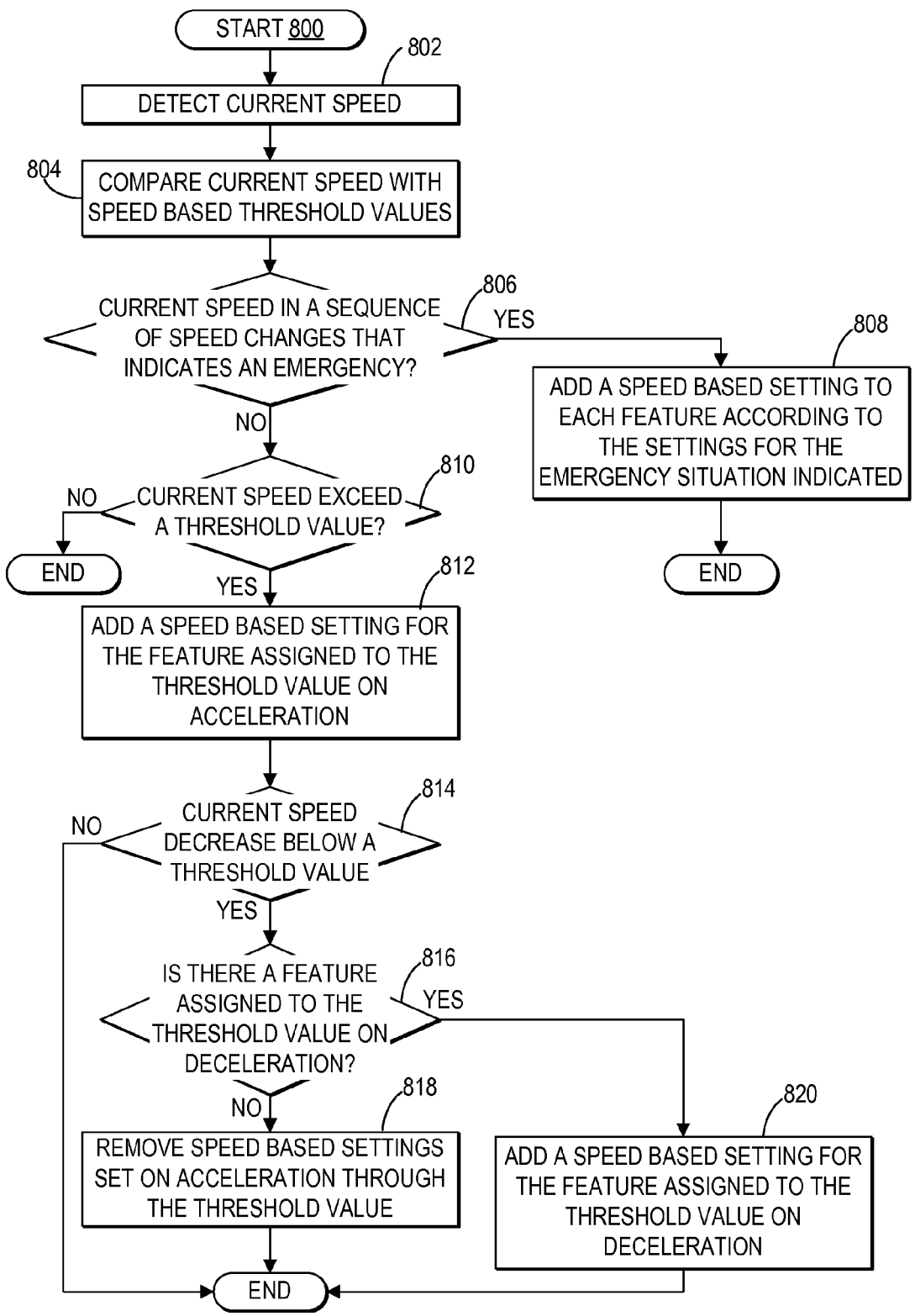
FIG. 8 a high level logic flowchart depicting a process and program for adjusting feature settings of a portable communication device based on current speeds passing threshold values.

Referring now to FIG. 8, a high level logic flowchart depicts a process and program for adjusting feature settings of a portable communication device based on current speeds passing threshold values. In the embodiment, the process starts at block 800 and thereafter proceeds to block 802. Next, block 804 illustrates comparing the current speed with the speed based threshold values. Thereafter, block 806 depicts a determination whether the current speed is in a sequence of speed changes that indicates an emergency when compared with the emergency based speed threshold values. If the current speed is in a sequence of speed changes that indicates an emergency, then the process passes to block 808. Block 808 illustrates adding a speed based setting for features in the device feature settings according to the settings for the emergency situation indicated, and the process ends. In addition, although not depicted, when emergency settings are added to the device feature settings, a user may be prompted to indicate the addition and with a single selection remove the emergency settings.

Returning to block 806, if the current speed is not in a sequence of speed changes that indicates an emergency, then the process passes to block 810. Block 810 depicts a determination whether the current speed exceeds a threshold value. If the current speed exceeds a threshold value, then the process passes to block 812. Block 812 depicts adding a speed based setting for each feature assigned to the threshold value on acceleration, and the process ends.

Returning to block 810, if the current speed does not exceed a threshold value, then the process passes to block 814. Block 814 depicts a determination whether the current speed has decreased below a threshold value. If the current speed has not decreased below a threshold value, then the process ends. Otherwise, at block 814, if the current speed has decreased below a threshold value, then the process passes to block 816.

Block 816 illustrates a determination whether there is a feature assigned to the threshold value on deceleration. If there is a feature assigned to the threshold value on deceleration, then the process passes to block 820. Block 820 depicts adding a speed based setting for each feature assigned to the threshold value on deceleration. Otherwise, at block 816, if there is not a feature assigned to the threshold value on deceleration, then the process passes to block 818. Block 818 depicts removing speed based settings set on acceleration through the threshold value, and the process ends.

While the invention has been particularly shown and described with reference to a preferred embodiment, it will be understood by those skilled in the art that various changes in form and detail may be made therein without departing from the spirit and scope of the invention.

What is claimed is:

1. A portable communication device comprising:
   a speed detection controller for detecting a first speed of travel at a first time and at least one subsequent speed of travel at at least one subsequent time of said portable communication device independent of any vehicle temporarily transporting said portable communication device;
   a speed based setting controller for comparing a change in speed from said first speed to said at least one subsequent speed and an amount of time from said first time to said at least one subsequent time with a plurality of emergency thresholds each specifying a sequence of speed changes over a separate specified period of time for controlling at least one call notification feature if said change in speed over said amount of time indicate a particular sequence of speed changes over a particular specified period of time as an emergency when compared with said plurality of emergency thresholds;
   said speed based setting controller for automatically assigning a separate speed based setting for a particular emergency threshold from among said plurality of emergency thresholds to a separate current setting for each of said at least on call notification feature, responsive to said change in speed over said amount of time exceeding said particular emergency threshold from among said plurality of emergency thresholds; and
   a device feature controller for controlling an operability of each of said at least one call notification feature according to each said separate current setting for each of said plurality of features.

2. The portable communication device according to claim 1, further comprising:
   a GPS receiver for detecting at a first point in time, a first location of said portable communication device from a first set of GPS signals detected at said portable communication device;
   said GPS receiver for detecting at a second point in time, a second location of said portable communication device from a second set of GPS signals detected at said portable communication device; and
   said speed detection controller for calculating one from among said first speed and said at least one subsequent speed based on a distance traveled between said first location and said second location over a time from said first point in time to said second point in time.

3. The portable communication device according to claim 1, said speed based setting controller further comprising:
   means for prompting a user via an output interface of said portable communication device with a notification of said current speed of travel and a selectable option for setting a current speed of travel of at least one of said first speed and said at least one subsequent speed to a new threshold value at said portable communication device to limit at least one of said call notification feature for safe use of said portable communication device; and
   means, responsive to receiving a selection by said user of said selectable option, for adding said current speed as a speed for said new threshold value to said plurality of emergency thresholds at said portable communication device.

4. The portable communication device according to claim 1, said speed based setting controller further comprising:
   means, responsive to a current speed decelerating below said particular emergency threshold, automatically returning said separate current setting for each said feature to a previous non-speed based setting.

5. The portable communication device according to claim 1, said speed based setting controller further comprising:
   means, responsive to a current speed decelerating below said particular emergency threshold, for automatically assigning to each said separate current setting for each said feature, of said plurality of features assigned to said particular emergency threshold to adjust on deceleration, a separate speed based setting.

6. The portable communication device according to claim 1, wherein said at least one of said first speed and said subsequent speed comprises a horizontal speed of travel element and a vertical speed of travel element.

\* \* \* \* \*